US012613368B2

(12) United States Patent
Williams et al.

(10) Patent No.: US 12,613,368 B2
(45) Date of Patent: Apr. 28, 2026

(54) MAGNETIC LIGHT PANEL AND METHODS OF USE AND CREATION

(71) Applicant: Guidecraft, Inc., Tuxedo, NY (US)

(72) Inventors: Andrew T. Williams, Warwick, NY (US); Cynthia Gloria Gennarelli, Franklin Lakes, NJ (US); Yuanyuan Shi, Ningbo (CN)

( * ) Notice: Subject to any disclaimer, the term of this patent is extended or adjusted under 35 U.S.C. 154(b) by 0 days.

(21) Appl. No.: 17/986,250

(22) Filed: Nov. 14, 2022

(65) Prior Publication Data

US 2024/0159954 A1     May 16, 2024

(51) Int. Cl.
*F21V 8/00* (2006.01)

(52) U.S. Cl.
CPC ......... *G02B 6/0055* (2013.01); *G02B 6/0025* (2013.01); *G02B 6/0073* (2013.01)

(58) Field of Classification Search
CPC ... G02B 6/0055; G02B 6/0025; G02B 6/0073
See application file for complete search history.

(56) References Cited

U.S. PATENT DOCUMENTS

| | | | | |
|---|---|---|---|---|
| 6,490,139 B1 * | 12/2002 | Hayashi | ............... | G11B 5/3967 |
| 6,981,792 B2 | 1/2006 | Nagakubo et al. | | |
| 7,901,213 B1 * | 3/2011 | Beno | ........................ | B43L 1/00 |
| | | | | 434/408 |
| 11,356,287 B2 * | 6/2022 | Denton | ................ | H03K 19/003 |

| | | | | |
|---|---|---|---|---|
| 2003/0137630 A1 * | 7/2003 | Niiya | .................... | G02F 1/1339 |
| | | | | 349/153 |
| 2009/0100727 A1 * | 4/2009 | Chen | ........................ | G09F 13/20 |
| | | | | 40/546 |
| 2016/0181879 A1 * | 6/2016 | Zucker | ..................... | H02K 3/04 |
| | | | | 310/68 B |
| 2018/0157115 A1 | 6/2018 | Hiheno | | |
| 2018/0361863 A1 * | 12/2018 | Islinger | ................ | H02J 7/0013 |
| 2019/0280139 A1 * | 9/2019 | Donahue | .............. | H01L 31/054 |

FOREIGN PATENT DOCUMENTS

| | | | | |
|---|---|---|---|---|
| WO | WO-2013022768 A2 * | 2/2013 | ............. | A45C 11/00 |

OTHER PUBLICATIONS

FestDeng (brand), "Magnetic Light Box for Tracing, A4 Light Pad for Drawing with 4 Magnets, 2 Scale (cm & Inch) Portable Ultra-Thin Sketch Pad, Dimmable Light Table for Diamond Painting, X-ray View (4 Magnets Included)", Amazon.com, https://www. amazon.com/Tracing-A4-Portable-Ultra-Thin-Stepless-Dimmable/ dp/B082MFVM4H/, accesed Nov. 14, 2022.
AGPTEK (brand), "Magnetic A4 Led Artcraft Tracing Light Pad 4 Light Box Ultra-Thin Physical Buttons Control with Memory Function USB Powered Pad Animation,Sketching,Designing,Stencilling X-ray Viewing W/USB Adapter", Amazon.com, https://www. amazon.com/Ultra-thin-Brightness-Animation-Sketching-Stencilling/ dp/B0771J6JY4/, accessed Nov. 14, 2022.

(Continued)

*Primary Examiner* — Lucy P Chien
(74) *Attorney, Agent, or Firm* — Richard W. James

(57) ABSTRACT

A magnetic light panel. The magnetic light panel includes an acrylic substrate, a reflective substrate adjacent an internal surface of the acrylic substrate, a light directed toward a continuous edge of the acrylic substrate, a ferromagnetic substrate adjacent to the reflective substrate, and a housing.

20 Claims, 4 Drawing Sheets

(56) References Cited

OTHER PUBLICATIONS

Comzler (brand), "comzler Light Board, A4 Tracing Light Box, Magnetic Light Pad, Light Table for Tracing, LED Light Drawing Board, Sketch Pad LED Light Drawing Pad, Cricut Light Pad, Dimmable Brightness", Amazon.com, https://www.amazon.com/Portable-Tracing-Magnetic-Drawing-Sketching/dp/B07VF42DDB/, accessed Nov. 14, 2022.

* cited by examiner

100

101

102

104

106

136

112

110

108

MAGNETIC LIGHT PANEL AND METHODS OF USE AND CREATION

CROSS-REFERENCE TO RELATED APPLICATIONS

None

FIELD OF THE INVENTION

This invention is related to light panels and more particularly to apparatuses and methods for magnetically engaging items to an LED light panel.

BACKGROUND OF THE INVENTION

Light panels are devices that have a lighted display screen. light panels provide a bright background on which many tasks may be performed, from tracing to play with illuminated items. Because of their simplicity, light panels are often used by children for purposes including entertainment and learning at home, while traveling, or in remote locations.

Translucent objects may be placed or stacked on existing light panels, but existing light panels suffer from the limitation that those translucent objects may not remain in place on the light panel. Moreover, existing light panels do not encourage a child to interact with the panel with certain tactile toys, such as the magnetic toys that are usually included in a child's toy collection. Existing light panels may, furthermore, not be ideal for tracing or coloring on a piece of paper placed on the light panel screen because that paper is likely to move undesirably. Tactile toys also may not interact well with existing light panel because they may fall off the light panel when the light panel is manipulated.

Accordingly, there is a need for a light panel to which a magnet can attach.

There is a need for a method of creating a magnetic light panel, as well.

There is also a need for an effective method of using such a magnetic light panel.

There is also a need to attach paper or other materials to a light panel securely.

In addition, there is a need for a magnetic light panel to which a child can attach a small children's magnetic toy having a small magnetic field strength and thus permitting the magnetic toy to be securely attached to the light panel, while requiring little force for a child to move the magnetic toy once placed, a toy of the type found in various children's toy sets.

BRIEF DESCRIPTION OF THE DRAWINGS

The accompanying drawings, wherein like reference numerals are employed to designate like components, are included to provide a further understanding of latch apparatuses and methods of use, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein.

SUMMARY OF THE INVENTION

Figure 1:
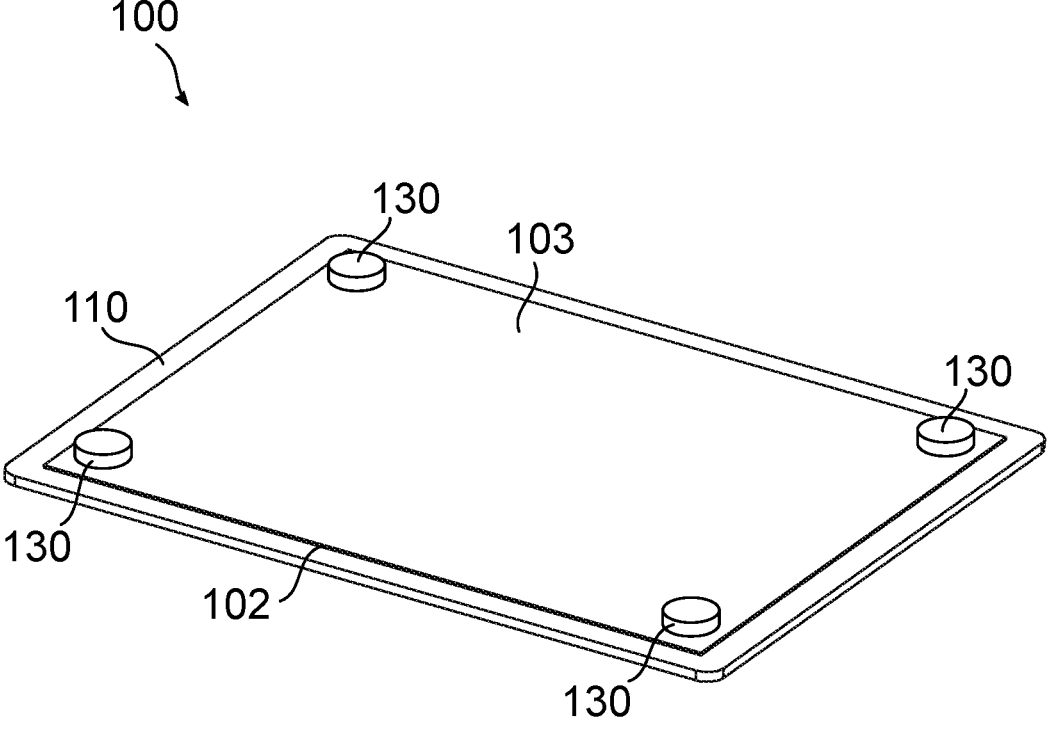
FIG. 1 illustrates a screen-side perspective view of an embodiment of a magnetic light panel of the present invention having a plurality of magnets placed on the light panel screen.

In an embodiment, a magnetic light panel has an acrylic substrate that has an exposed surface, an internal surface, a continuous edge, a thickness of 2.5 millimeters or less, and a series of light transmitting marks formed on the internal surface of the acrylic substrate. A reflective substrate is adjacent to the internal surface of the acrylic substrate to reflect light transmitted into the acrylic substrate to the exposed surface of the acrylic substrate for viewing by a person looking at the exposed surface screen of the magnetic light panel. A light is directed toward the continuous edge of the acrylic substrate in that embodiment and a ferromagnetic substrate is adjacent to the reflective substrate for attracting a magnet adjacent the exposed surface of the acrylic substrate or a diffuser sheet placed over the exposed surface of the acrylic substrate. A housing surrounds the internal components of the magnetic light panel of that embodiment and may be placed behind the ferromagnetic substrate and wrap around the remaining components of the magnetic light panel. The housing has a continuous lip extending from an outer edge of the housing, and that continuous lip retains the acrylic substrate, the reflective substrate, the light source, and the ferromagnetic substrate in place and protects those components and any other components of the magnetic light panel, such as power components.

In another embodiment, a method of creating a magnetic light panel includes providing a ferromagnetic substrate under an acrylic viewing screen, the acrylic viewing screen having a thickness in the range of 1 millimeter to 2.5 millimeters, and directing LED light into a side of the acrylic viewing screen onto a series of reflective marks for viewing on an exposed surface of the acrylic viewing screen.

In yet another embodiment, the present invention includes a method of using a magnetic light panel that includes placing a magnet on an acrylic screen having a plurality of reflective marks that transmit light to a viewing surface of the screen, the magnet having a cubic dimension of not more than 113 cubic millimeters and having a magnetic attraction such that the magnet will remain adjacent to the acrylic screen when a pull force of 0.6 newtons is applied to the magnet perpendicular to the acrylic screen. That method of using a magnetic light panel also includes directing an LED light into a side of the acrylic screen onto the plurality of reflective marks such that light from the LED light is reflected off the reflective marks for viewing on the viewing surface of the acrylic screen. In that embodiment, a reflective substrate or material may be placed on or adjacent to an internal surface of the acrylic viewing screen and that reflective substrate or material may reflect light from the LED light for viewing on the viewing surface of the acrylic screen. A diffuser sheet may be placed over the acrylic screen to protect the acrylic screen or to enhance viewing of the acrylic screen in certain embodiments.

Other embodiments, which may include one or more portions of the aforementioned apparatuses and methods or other parts or elements, are also contemplated, and may have a broader or different scope than the aforementioned apparatuses and methods. Thus, the embodiments in this Summary of the Invention are mere examples, and are not intended to limit or define the scope of the invention or claims.

DETAILED DESCRIPTION OF THE INVENTION

Reference will now be made to embodiments of magnetic panel apparatuses and methods, examples of which are shown in the accompanying drawings. Details, features, and advantages of those magnetic light panels and methods of use will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

For purposes of the description hereinafter, the terms "above," "below," "upper," "lower," "right," "left," "vertical," "horizontal," "top," "bottom," "back," "lateral," "longitudinal," and derivatives thereof shall relate to the concept as it is oriented in the drawing figures to which such reference is made. It is to be understood, however, that the magnetic light panel may assume various alternative variations, except where expressly specified to the contrary. It is also to be understood that the specific devices illustrated in the attached drawings, and described in the following specification, are exemplary embodiments of the concept. Hence, specific dimensions and other physical characteristics related to the embodiments disclosed herein are not to be considered as limiting.

FIG. 1 illustrates a perspective view of an embodiment of a magnetic light panel 100 of the present invention. That embodiment includes an acrylic substrate 102 that forms all or part of a viewing screen 103 and a housing 110. As may be seen in FIG. 1, the magnetic light panel 100 is a simple device externally, making it simple to manipulate and use in a variety of situations and locations. Components that cause the magnetic light tablet to operate and perform its desired function, including holding magnetic devices 130 to the acrylic substrate 102, are internal to the magnetic light tablet 100 in this embodiment and not directly accessible to a user of the magnetic light tablet 100.

The magnetic light panel 100 may take a variety of forms, from a portable light panel 100 that may be used when traveling or moving about, to a light panel 100 having legs and generally standing in a fixed location like a table, to a tabletop form of light panel 100 that can be moved and used on a table, floor, or other desired location.

Figure 2:
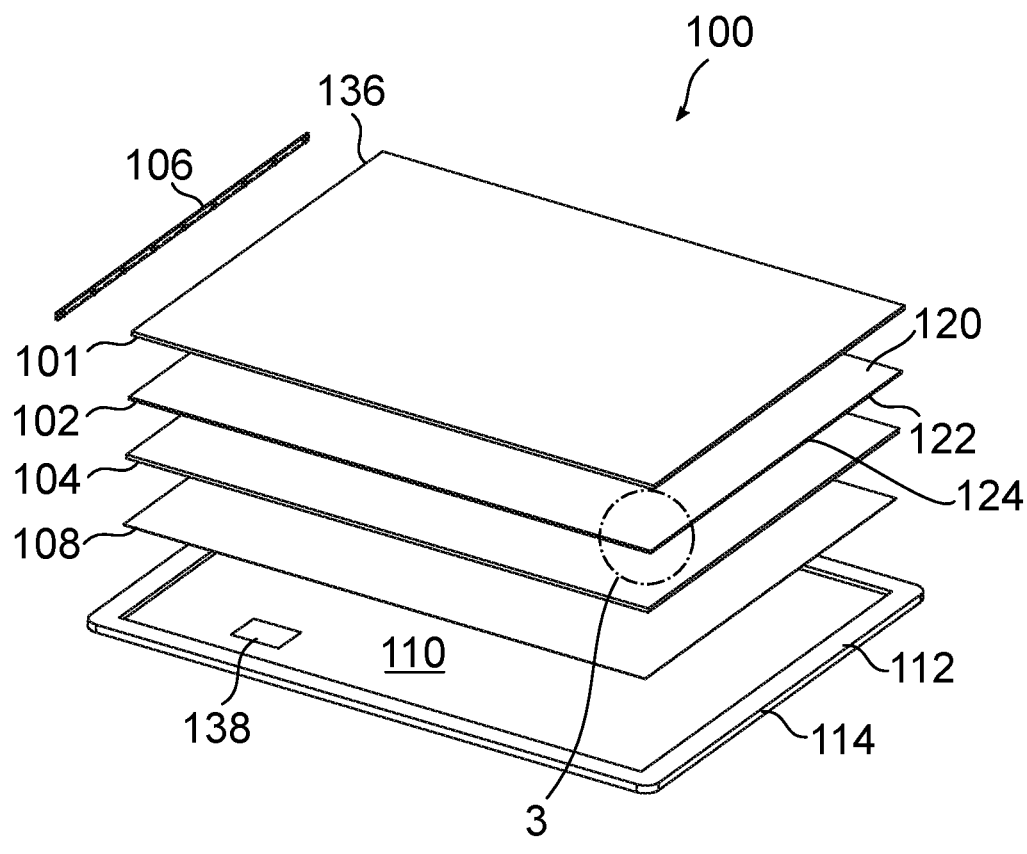
FIG. 2 illustrates an exploded perspective view of a magnetic light panel of the present invention.

FIG. 2 provides an exploded perspective view of an embodiment of a magnetic light panel 100 of the present invention illustrating various internal components of the magnetic light panel 100. That embodiment includes a diffuser sheet 101 placed on or adjacent to an exposed surface 120 of the acrylic substrate 102, a reflective substrate 104 adjacent an internal surface 122 of the acrylic substrate 102, a light 106 directed toward a continuous edge 124 of the acrylic substrate 102, a ferromagnetic substrate 108 adjacent to the reflective substrate 104, and the housing 110 adjacent to the ferromagnetic substrate 108. The housing 110 may have a continuous lip 112 extending from an outer edge 114 of the housing 110, the continuous lip 112 retaining the acrylic substrate 102, the reflective substrate 104, and the ferromagnetic substrate 108 in place.

The acrylic substrate 102 includes the exposed surface 120, the internal surface 122, the continuous edge 124, and a plurality of reflective marks 126. The exposed surface 120 of the acrylic substrate 102 may be covered by a diffuser sheet 101 and one or more magnets 130 may be placed on the exposed surface of the acrylic substrate 102 or on the diffuser sheet 101. The acrylic substrate 102 may furthermore have a thickness of 2.5 millimeters or less in an embodiment and may, in certain embodiments, be formed to have a thickness of 1.5 millimeters to 2 millimeters. The thickness of the acrylic substrate 102 may furthermore not be uniform such that, for example, the acrylic substrate 102 may be thicker at its center than at its continuous edge 124 or the acrylic substrate may be thinner at its center and thinner at its continuous edge 124. A thinner acrylic substrate is thought to minimize interference with or minimize reduction of a magnetic field between the one or more magnets 130 placed on the exposed surface 120 of the acrylic substrate 102 or diffuser sheet 101 and the ferromagnetic substrate 108 placed beneath and adjacent to the internal surface 122 of the acrylic substrate 102. It should be recognized that the ferromagnetic substrate 108 may not be in direct contact with the internal surface 122 of the acrylic substrate 102. For example, the reflective substrate 104 may be placed and reside between the internal surface 122 of the acrylic substrate 102 and the ferromagnetic substrate 108.

The ferromagnetic substrate 108 may be formed of steel or another material that to which magnets are attracted. The thickness of the steel sheet used as the ferromagnetic substrate 108 in embodiments of the magnetic light panel 100 can range from 0.3 millimeters to 1 millimeter, recognizing that a thinner ferromagnetic substrate 108 may beneficially reduce the weight of the magnetic light panel 100, while a thicker ferromagnetic substrate 108 may beneficially enhance the force of a magnetic field of a magnet 130 placed on or near the exposed surface 120 of the acrylic substrate 102. In an embodiment, the ferromagnetic substrate 108 is a 0.5-millimeter-thick steel sheet and in another embodiment the ferromagnetic substrate 108 is a 0.7-millimeter-thick steel sheet. Alternatively, a magnetic substrate that itself has a magnetic field and attracts the magnet 130 when the magnet 130 is placed on or near the exposed surface 120 of the acrylic substrate 102 may be employed in place of or in addition to the ferromagnetic substrate 108.

The one or more magnets 130 may have a magnetic field that attracts those magnets 130 to the ferromagnetic substrate 108 or the magnetic substrate. The magnets 130 may be engaged on or adjacent to the exposed surface of the acrylic substrate 102 or the diffuser sheet 101 disposed on the exposed surface 120 of the acrylic substrate 102. In an embodiment, the thickness of the ferromagnetic substrate 108 and the arrangement of the ferromagnetic substrate 108 under the acrylic substrate 102 is such that a 113 cubic millimeter magnet placed on or adjacent to the exposed surface 120 of the acrylic substrate 102 will remain on or adjacent to the exposed surface 120 of the acrylic substrate 102 when a pull force equal to or greater than 0.6 newtons is applied to the magnet 130. Such a level of magnetic attraction is thought to be appropriate to permit a child to attach children's toys with magnets to and remove them from the screen 103 of the LED light panel 100.

The reflective substrate 104 may, for example, be a 4 mil or 4 thousandths of an inch thick reflective paper backing to reflect light emitted by the light 106 onto the acrylic substrate 102 for viewing.

The light 106 may be situated in the housing 110 and situated such that when the light 106 is energized, light emitted from the light 106 is directed at an edge 124 of the acrylic substrate 102. The light 106 may include or consist of one or more light-emitting diodes (LEDs) and may, for example, be a 2 mm wide organic light-emitting diode (OLED) strip of LEDs that is the length or near the length of a side 136 of the acrylic substrate 102. Such an OLED strip may alternatively extend around all or a portion of a circumference of the continuous edge 124 of the acrylic substrate 102. The acrylic substrate 102 may furthermore include a series or grid of reflective, refractive, or light transmitting dots or marks 126 formed on the internal surface 122 of the acrylic substrate 102 and light emitted from the light 106 may reflect off those marks 126 and appear to a user looking at the exposed surface 120 of the acrylic substrate 102.

The housing 110 may be plastic, metal, wood, or another desired material that has qualities desired in the housing 110 of a magnetic light panel 100, such as, for example, light in weight, resistant to breaking when dropped on a hard surface, comfortable to touch, and pleasing in appearance. The housing 110 may enclose the various parts of the magnetic light panel, including a battery or a power supply 138 used to energize the light 106. The housing 110 may extend around or encompass various parts of the magnetic light panel, including the reflective substrate 104, the light 106, the ferromagnetic substrate 108, and the various internal components including the battery and power supply, and may engage the continuous edge 124 of the acrylic substrate 102. The housing 110 may include a continuous lip 132 that retains the acrylic substrate in place and the housing 110 may extend beyond the exposed surface 120 of the acrylic substrate 102 to protect the exposed surface 120 of the acrylic substrate 102 from damage when the magnetic light panel 100 is dropped or roughly handled. The housing may, for example, be formed of fifteen-millimeter-thick wood or two-millimeter-thick plastic.

In an embodiment, the magnetic light tablet 100 has an acrylic substrate 102 that has an exposed surface 120, an internal surface 122, a continuous edge 124, a thickness of 2.5 millimeters or less, and a series of light transmitting marks 126 formed on the internal surface 122 of the acrylic substrate 102. A reflective substrate 104 is adjacent to the internal surface 122 of the acrylic substrate 102 to reflect light transmitted into the acrylic substrate 102 to the exposed surface 120 of the acrylic substrate 102 for viewing by a person looking at the screen of the magnetic light panel 100 in that embodiment. A light is directed toward the continuous edge 124 of the acrylic substrate 102 in that embodiment and a ferromagnetic substrate 108 is adjacent to the reflective substrate 104 for attracting a magnet 130 adjacent the exposed surface 120 of the acrylic substrate 102 or a diffuser sheet 101 placed over the exposed surface 120 of the acrylic substrate 102.

A housing 110 surrounds the internal components of the magnetic light panel 100 of that embodiment and may be placed behind the ferromagnetic substrate 108. The housing 110 has a continuous lip 132 extending from an outer edge of the housing 110, and that continuous lip 132 retains the acrylic substrate 102, the reflective substrate 104, the light source 106, and the ferromagnetic substrate 108 in place and protects those components 102, 104, 106, and 108 and other components of the magnetic light panel 100, such as power components 138 and provides protection for those components 102, 104, 106, 108, and 138.

Variations of that embodiment include a steel ferromagnetic substrate 108 that has a thickness of at least 0.5 millimeters and a light 106 that consists of a light-emitting diode strip that extends along one of four sides of the acrylic substrate 102 continuous edge 124. The light 106 may, alternatively, be a light-emitting diode strip that extends around a circumference of the acrylic substrate 102 continuous edge 124. Light transmitted by the light 106 may reflect off the light transmitting marks 126 for viewing on the exposed surface of the acrylic substrate 102 and may also be reflected from the reflective substrate to the acrylic substrate 102.

A magnet 130 may be placed on or adjacent to the exposed surface 120 of the acrylic substrate 102. That magnet 130 may have various uses, including being a simple toy that is illuminated by the magnetic light panel 100. That toy may be on the magnetic light panel 100 alone or may be added to a picture or one or a grouping of objects placed on the acrylic substrate 102. The magnet 130 may also hold a paper or other thing to the acrylic substrate 102 for tracing or another purpose. That magnet 130 may, furthermore, be a ferrite magnet alone or included in a simple children's toy or the magnet 130 may be another desired type of magnet. That magnet may be 113 cubic millimeters in an embodiment and may be not more than 200 cubic millimeters in other embodiments, as may be appropriate for a children's toy. The combination of the ferromagnetic substrate 108 and the substrates between the ferromagnetic substrate 108 and the magnet 130, including the diffuser sheet 101, the acrylic substrate 102, the reflective substrate 104 and any other substrate or material placed between the ferromagnetic substrate 108 and the magnet 130, may provide a magnetic force that requires 0.4 newtons, 0.5 newtons, 0.6 newtons, or more than 0.6 newtons applied to the magnet 130 perpendicular to the acrylic substrate 102 to remove the magnet 130 from the magnetic light panel 100 depending on the intended user and use of the magnet 130.

In an embodiment, the present invention includes a method of creating a magnetic light panel 100 that includes providing a ferromagnetic substrate 108 under an acrylic viewing screen 102, the acrylic viewing screen 102 having a thickness of 1 millimeter, 1.5 millimeters, 2 millimeters, or 2.5 millimeters or anywhere in the range of 1 millimeter to 2.5 millimeters, and directing LED light into a side 122 of the acrylic viewing screen 102 onto a series of reflective marks 126 that reflect the LED light to an exposed surface 120 of the acrylic viewing screen 102 for viewing.

In that embodiment, the light 106 may be projected from one or more LEDs and may reflect off marks 126 in the acrylic viewing screen 102 onto a viewing surface 120 of the acrylic viewing screen 102 and may also reflect off a reflective substrate or material 104 placed on or adjacent to an internal surface 122 of the acrylic viewing screen 102.

In another embodiment, the present invention includes a method of using a magnetic light panel 100 that includes placing a magnet 130 having a magnetic attraction such that if the magnet 130 has a cubic dimension of not more than 113 cubic millimeters, it will remain adjacent to an exterior surface 120 of an acrylic screen 102 having a plurality of reflective marks 126 when a pull force of 0.5, 0.6, or 0.7 newtons is applied to the magnet 130 perpendicular to the acrylic screen 102, as desired for a user of a particular age.

That method further includes directing an LED light 106 into a side of the acrylic screen 102 onto the plurality of reflective marks 126 such that light from the LED light 106 is reflected off the reflective marks 126 for viewing on the exposed surface 120 of the acrylic screen 102. In that embodiment, a reflective substrate or material 104 may be placed on or adjacent to the internal surface 122 of the acrylic viewing screen 102 and that reflective substrate or material 104 may reflect light from the LED light 106 for viewing on the exposed surface 120 of the acrylic screen 102. A diffuser sheet 101 may be placed over the acrylic screen 102 to protect the acrylic screen 102 or to enhance viewing of the acrylic screen 102 in certain embodiments.

Figure 3:
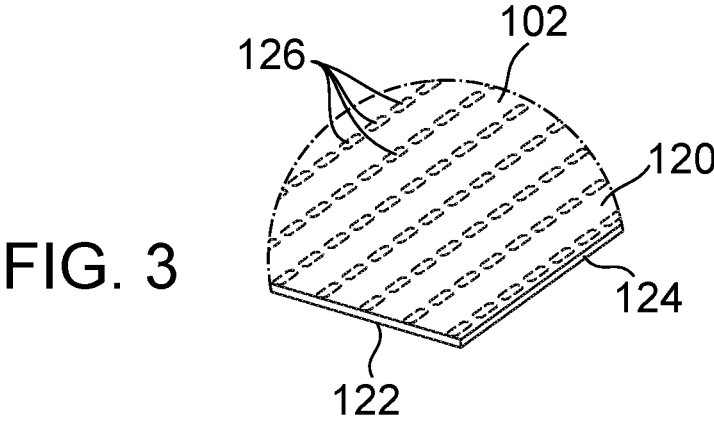
FIG. 3 illustrates reflective marks created on a surface of the magnetic light panel.

FIG. 3 illustrates one pattern of reflective marks 126 that may be placed on the internal surface 122 of the acrylic substrate 102 and used for reflecting light directed into at least one edge of the acrylic substrate 102 onto the screen surface 120 of the acrylic substrate 102 for viewing.

Figure 4:
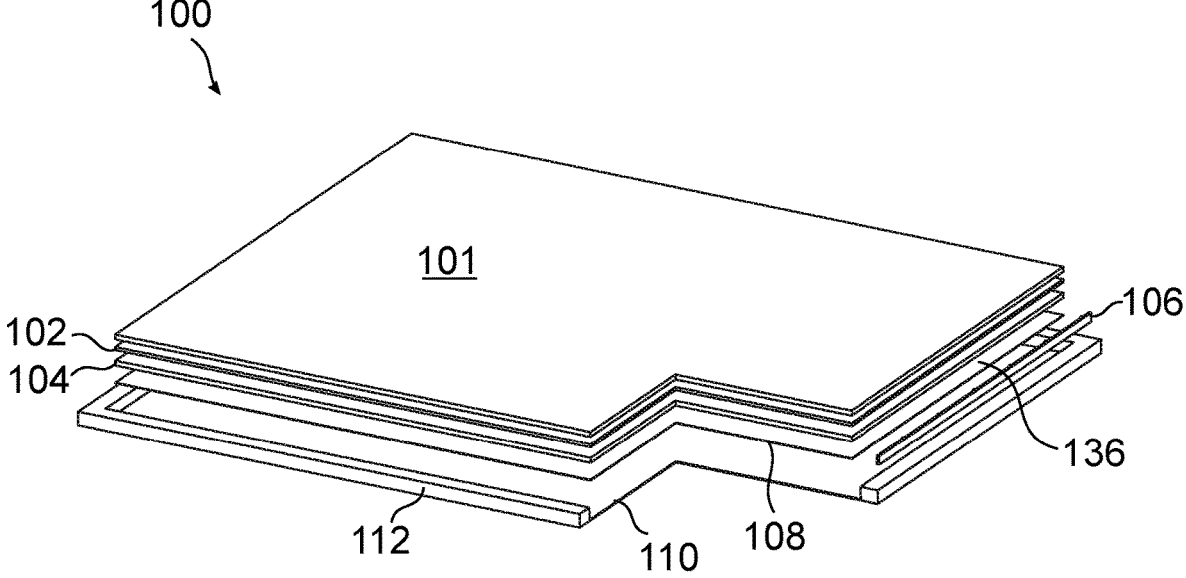
FIG. 4 illustrates another exploded perspective view of the magnetic light panel of FIG. 2 having a cutout section that is illustrated in a close-up view in FIG. 5.
Figure 5:
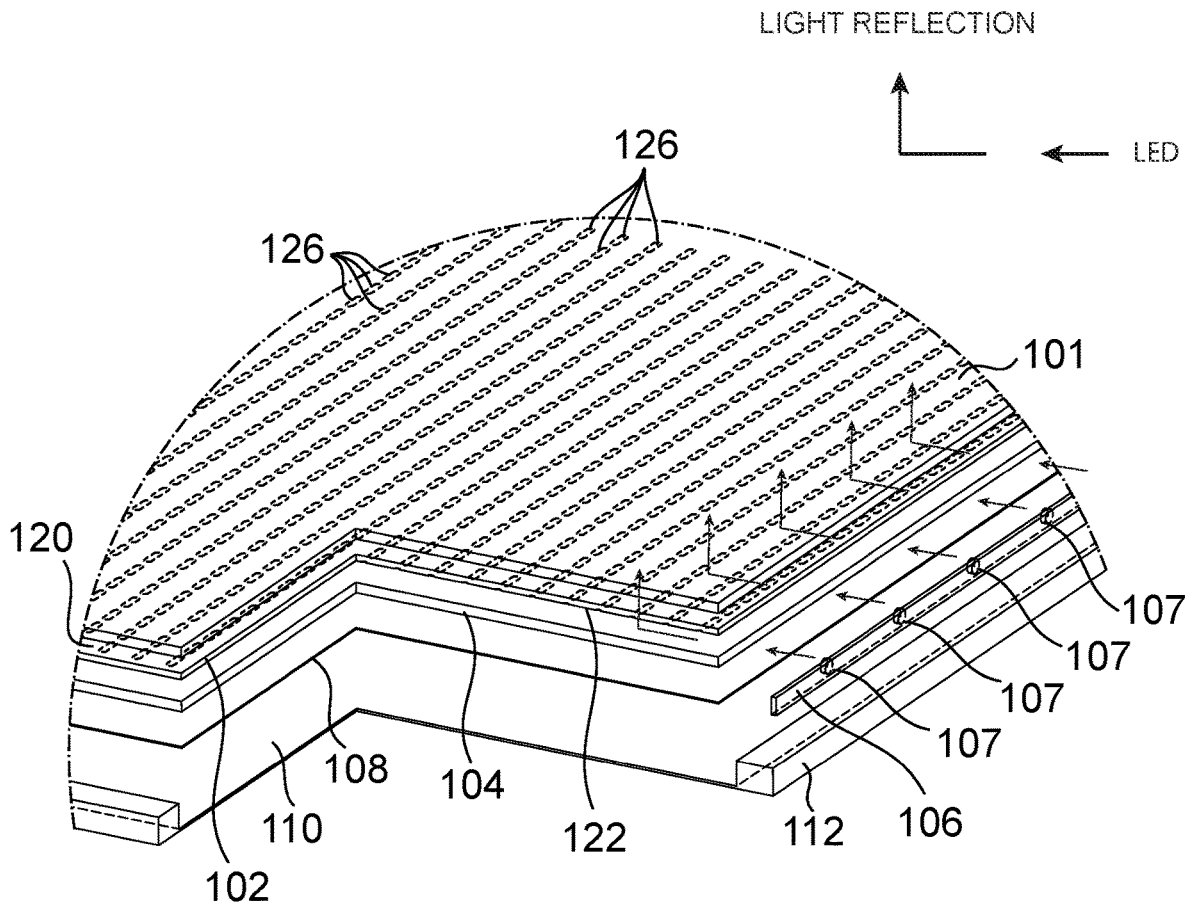
FIG. 5 provides a close-up view of a section of the magnetic light panel illustrated in FIGS. 2 and 4 that illustrates the reflection of light entering the acrylic substrate.

FIG. 4 illustrates another exploded perspective view of the magnetic light panel of FIG. 2 indicating a cutout section that is illustrated in FIG. 5. FIG. 5 provides a close-up view of a section of the magnetic light panel 100 illustrated in FIGS. 2 and 4 that illustrates the reflection of the light entering the acrylic substrate 102 off the reflective marks 126 to the exposed surface 120 of the acrylic substrate 102. As is illustrated in FIG. 5, light from individual bulbs 107 that make-up the light source 106 is directed into one edge 124 of the acrylic substrate 102 and that light is reflected off reflective marks 126 formed on the acrylic substrate 102 at an angle so that the light may be seen by a viewer looking at the exposed surface 120 of the acrylic substrate 102. The angle at which light from the light source 106 is reflected off the reflective marks 126 may be a 45-degree angle as depicted or light may be reflected at another desired angle.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. A magnetic light panel, comprising:
   an acrylic substrate viewing screen having:
      an exposed surface;
      an internal surface;
      a continuous edge;
      a thickness of 2.5 millimeters or less; and
      a series of light transmitting marks formed on the internal surface of the acrylic substrate;
   a light reflecting reflective substrate adjacent the internal surface of the acrylic substrate;
   a light directed toward the continuous edge of the acrylic substrate;
   a ferromagnetic substrate adjacent to the reflective substrate; and
   a housing adjacent the ferromagnetic substrate, the housing having a continuous lip extending from an outer edge of the housing, the continuous lip retaining the acrylic substrate, the reflective substrate, the light source, and the ferromagnetic substrate in place.

2. The magnetic light panel of claim 1, wherein the ferromagnetic substrate is a steel sheet having a thickness of at least 0.5 mm.

3. The magnetic light panel of claim 1, wherein the reflective substrate is a reflective paper.

4. The magnetic light panel of claim 1, wherein the light is a light emitting diode strip that extends along at least one of four sides of the acrylic substrate continuous edge.

5. The magnetic light panel of claim 4, wherein light emitted from the light-emitting diode strip reflects off the light transmitting marks for viewing on the exposed surface of the acrylic substrate.

6. The magnetic light panel of claim 5, wherein light emitted from the light-emitting diode strip reflects from the light transmitting marks off the reflective substrate for viewing on the exposed surface of the acrylic substrate.

7. The magnetic light panel of claim 4, wherein the light is a light emitting diode strip that extends around a circumference of the acrylic substrate continuous edge.

8. The magnetic light panel of claim 1, further comprising a removable magnet adjacent the exposed surface of the acrylic substrate and having a magnetic field that attracts the magnet to the ferromagnetic substrate, the magnet to be placed on and removed from the acrylic substrate by a human.

9. The magnetic light panel of claim 8, wherein the magnet is a ferrite magnet.

10. The magnetic light panel of claim 8, wherein the panel has a magnetic attraction such that a magnet of not more than 113 cubic millimeters, will remain on the exterior surface when a pull force equal to 0.6 newtons is applied to the magnet perpendicular to the acrylic substrate.

11. The magnetic light panel of claim 1, wherein the acrylic substrate has a thickness of not more than 2 mm.

12. The magnetic light panel of claim 1, wherein the acrylic substrate has a thickness of not more than 1.5 mm.

13. The magnetic light panel of claim 1, wherein the housing is wood.

14. A method of creating a magnetic light panel, comprising:
   providing a ferromagnetic substrate under an acrylic viewing screen having a thickness of 2.5 millimeters or less;
   directing LED light into an edge of the acrylic viewing screen onto a series of reflective marks for viewing on an exposed surface of the acrylic viewing screen;
   a housing adjacent the ferromagnetic substrate, the housing having a continuous lip extending from an outer edge of the housing, the continuous lip retaining the acrylic viewing screen, the light source, and the ferromagnetic substrate in place; and
   magnetically affixing a magnet to the acrylic viewing screen.

15. The method of creating a magnetic light panel of claim 14, wherein the reflective marks reflect the LED light onto the acrylic viewing screen.

16. The method of creating a magnetic light panel of claim 14, further comprising placing a reflective material adjacent an internal surface of the acrylic viewing screen to reflect the LED light onto the acrylic viewing screen.

17. The method of creating a magnetic light panel of claim 15, wherein the acrylic viewing screen has a thickness of less than 2 millimeters.

18. A method of using a portable magnetic light panel, comprising:
   placing a magnet on a viewing surface of an acrylic viewing screen having a plurality of reflective marks that transmit light to a viewing surface of the viewing screen, the magnet having a cubic dimension of not more than 113 cubic millimeters and having a magnetic attraction such that the magnet will remain adjacent to the acrylic viewing screen when a pull force of 0.6 newtons is applied to the magnet perpendicular to the acrylic viewing screen, a magnetic substrate retained adjacent an internal surface of the acrylic viewing screen opposite the viewing surface of the acrylic viewing screen by a housing, the magnetic substrate attracting the magnet; and directing LED light into a side of the acrylic viewing screen onto the plurality of reflective marks such that light from the LED light is reflected off the reflective marks for viewing on the exposed surface of the acrylic viewing screen.

19. The method of using a magnetic light panel of claim 18, further comprising reflecting light from the LED off a reflective substrate adjacent an internal surface of the acrylic substrate.

20. The magnetic light panel of claim 19, further comprising placing a diffuser sheet on the exterior surface of the acrylic sheet to be present between the acrylic sheet and the magnet.

\* \* \* \* \*